US012566878B2

(12) United States Patent
Alagar

(10) Patent No.: US 12,566,878 B2
(45) Date of Patent: Mar. 3, 2026

(54) DATA SANITIZER

(71) Applicant: Bank of America Corporation, Charlotte, NC (US)

(72) Inventor: Ramesh Alagar, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 18/401,638

(22) Filed: Jan. 1, 2024

(65) Prior Publication Data

US 2025/0217504 A1 Jul. 3, 2025

(51) Int. Cl.
*G06F 21/62* (2013.01)

(52) U.S. Cl.
CPC ................................. *G06F 21/6218* (2013.01)

(58) Field of Classification Search
None
See application file for complete search history.

(56) References Cited

U.S. PATENT DOCUMENTS

| | | | |
|---|---|---|---|
| 8,655,939 | B2 | 2/2014 | Redlich et al. |
| 8,782,343 | B2 | 7/2014 | Nagpal et al. |
| 9,142,269 | B2 | 9/2015 | Hein |
| 9,485,088 | B2 | 11/2016 | Johnson |
| 9,640,233 | B2 | 5/2017 | Sohn |
| 9,734,169 | B2 | 8/2017 | Redlich et al. |
| 9,881,168 | B2 | 1/2018 | Chari et al. |
| 9,882,923 | B2 | 1/2018 | Molnar et al. |
| 10,135,796 | B2 | 11/2018 | Iyer et al. |
| 10,523,638 | B2 | 12/2019 | Druker et al. |
| 10,915,664 | B2 | 2/2021 | Mushkatblat |
| 11,030,157 | B2 | 6/2021 | Li et al. |
| 11,194,921 | B2 | 12/2021 | Cachin et al. |
| 11,196,750 | B2 | 12/2021 | Gibbons |
| 11,263,335 | B2 | 3/2022 | Parthasarathy |

(Continued)

FOREIGN PATENT DOCUMENTS

| | | |
|---|---|---|
| AU | 2018201272 | 3/2018 |
| EP | 2876574 | 5/2015 |
| JP | 7309849 | 7/2023 |

OTHER PUBLICATIONS

"10 Best Data Masking Tools and Software in 2024," Software Testing Help, Nov. 27, 2023.

(Continued)

*Primary Examiner* — Brandon Hoffman
(74) *Attorney, Agent, or Firm* — Weiss & Arons LLP

(57) ABSTRACT

Provided herein is an automated data sanitization system for sanitizing and overlaying data to a non-production environment. The system may include a data sanitization rule engine, which may be configured to receive a recommended set of rules for sanitizing a data source and/or define rules for the dataset. The system may include a feature comparison component, which may be configured to generate suggested sanitization rules for a new dataset, based on comparison with previous datasets. The system may include a data sanitization component, which may be configured to implement sanitization of a plurality of datasets. The system may include a gatekeeper, which may be configured to restrict export of a non-sanitized data source and/or to restrict overlaying of a non-sanitized data source onto a non-production environment.

17 Claims, 4 Drawing Sheets

(56) References Cited

U.S. PATENT DOCUMENTS

| | | | |
|---|---|---|---|
| 11,392,586 B2 | 7/2022 | Niu et al. | |
| 11,886,399 B2 | 1/2024 | Joyce et al. | |
| 2004/0103147 A1* | 5/2004 | Flesher | G06F 16/1767 |
| | | | 707/999.009 |
| 2008/0077907 A1* | 3/2008 | Kulkami | G03F 1/36 |
| | | | 716/53 |
| 2017/0171231 A1* | 6/2017 | Reybok, Jr. | H04L 63/1433 |
| 2024/0273556 A1* | 8/2024 | Kumar | G06Q 30/0201 |

OTHER PUBLICATIONS

Agrawal et al., "Mining Association Rules Between Sets of Items in Large Databases," IBM Almaden Research Center, Jun. 1993.
"Rule Based Machine Learning," Wikimedia Foundation, Inc., Retrieved on Jun. 5, 2023.
"Association Rule Learning," Wikimedia Foundation, Inc., Retrieved on Jun. 5, 2023.

* cited by examiner

DATA SANITIZER

FIELD OF TECHNOLOGY

Aspects of the disclosure relate to data sanitization. Further aspects of the disclosure relate to sanitization of data overlayed from a production environment to a non-production environment.

BACKGROUND

In software application and development, overlaying data from production to non-production environments is a commonly performed activity. The overlaid data may be used for multiple purposes such as user acceptance testing, performance testing, and the like. Data sanitization is an important component of the overlay process. Sanitization should be performed before developers or other users gain access to overlayed data, in order to prevent user exposure to critical and/or confidential data.

Data sanitization (or "masking") may serve to make an original dataset unrecognizable but still usable, which may enable use of the masked dataset without exposure risk. Typically, the original values may not be recoverable by any algorithm. The masked data may be a characteristically accurate but fictitious version of the original dataset.

Commonly, data sanitization may be performed manually. Data sanitization may be executed by preparing and running sanitization scripts. The scripts may be coded by developers.

SUMMARY

It is an object of this disclosure to automate the data sanitization process and its supervision.

It is a further object of this disclosure to protect confidential data from inadvertent exposure to developers and other users of non-production environments.

A method in accordance with the principles of the described embodiments may be implemented by a computer and/or be automated.

A method in accordance with the principles of the described embodiments may utilize a computer processor and one or more non-transitory computer-readable media storing computer executable instructions. The instructions, when executed by the computer processor, may automatically develop data sanitization protocols and perform various other activities, as described herein.

Provided herein is an automated system. The system may be for preventing inadvertent export of protected information. The system may prevent inadvertent overlay of a dataset containing protected information onto a different memory location. The system may include a user input layer, a computing layer, and a data import layer.

Any of the described systems and methods may be for preventing or impeding export or overlay of protected information from a production environment to a non-production environment. The systems and methods may prevent or impede export or overlay of protected information from a production environment onto, or into, a non-production environment. The production environment may be a high-level environment. The non-production environment may be a low-level environment. The systems and methods may be for preventing exposure of protected information to a user. The user may have access to a non-production environment.

The protected information may be derived from a non-sanitized data source. The non-sanitized data source may be located within the production environment. The data source may be configured to be overlaid onto the non-production environment. This overlaying step, when performed without sanitizing the data source, may generate a non-sanitized overlaid dataset.

Reference herein to "overlay/ing" of data may indicate transfer of information from a first file to a second file. The second file may contain an incomplete dataset, overlaying may include matching records of the second file to records to the first file's records.

The described system may include a data sanitization component or engine. The data sanitization component or engine may reside in the described computing layer.

The data sanitization component may be configured to sanitize the non-sanitized data source. The data sanitization component may be configured to remove protected information from the non-sanitized data source. This sanitizing step may generate a sanitized dataset. The sanitized dataset may be configured to be overlaid onto the non-production environment. This overlaying step (of the sanitized dataset) may generate a sanitized overlaid dataset.

The described system may include a user input layer. The user input layer may be referred to as a console.

The console may include a rule console. The rule console may reside in the described user input layer. The rule console may be for use by an infosec manager. The rule console may be for inputting permission rules for users of the system. The rule console may be for inputting general data sanitization. rules The described console may include a task console. The task console may reside in the described user input layer. The task console may be for requesting access to the sanitized overlaid dataset. The access may be for a non-production environment user (a user operating in a non-production environment). The access may be for a developer. The task console may be for viewing progress of requests to access datasets.

The console may include a query browser. The query browser may reside in the described user input layer. The query browser may be configured to receive a user query for retrieving a non-sanitized dataset. The query browser may be enabled for a to request access to a non-sanitized dataset. The query browser may be for use by a non-production environment user. The browser may be for a developer.

The described system may include a gatekeeper. The gatekeeper component may reside in the described computing layer.

The gatekeeper may be configured to restrict overlaying the non-sanitized data source onto the non-production environment. The gatekeeper may be configured to control overlaying of the non-sanitized data source. The gatekeeper may be configured to restrict generation of a non-sanitized overlaid dataset. The gatekeeper may be configured to generate an alert when a non-sanitized data source is overlaid onto a non-production environment.

In some embodiments of the automated system, the non-production environment of the described methods and systems may be a user acceptance testing environment. In some embodiments, the user acceptance testing environment may be for validating real-world performance of an application or a program. In some embodiments, the non-production environment may be a performance testing environment. In some embodiments, the performance testing environment may be for evaluating performance of an application under controlled stress conditions. The controlled stress conditions may include load testing, for example, wherein the program is accessed by a given number of simultaneous users. In some embodiments, performance testing may include testing the processor speed, data transfer rates, and/or bandwidth of program within its intended operating environment. In some embodiments, the performance testing environment may be any other type of non-production environment.

In some embodiments of the automated system, the protected information may be critical data. The term "critical data" may refer to data deemed essential for success by an organization. The term may refer to data that must be retained for regulatory purposes. In some embodiments, the protected information may be confidential data. The term "confidential data" may refer to data whose exposure violates the privacy rights of an individual or organization.

In some embodiments of the automated system, and of the described automated systems may include an identity and access management (IAM) component. The IAM component may reside in the described computing layer. In some embodiments, the IAM component may be for configuring permissions of individual users. In some embodiments, an information security (infosec) manager may have a higher permission level than other users. In some embodiments, an infosec manager may be allowed access to all datasets. In some embodiments, other users besides the infosec manager may be denied access to non-sanitized datasets. In some embodiments, other users besides the infosec manager may have individualized permission levels. In some embodiments, the infosec manager retains central control of all permission levels. In some embodiments, the IAM is pluggable. In some embodiments, the IAM can be incorporated into existing networks. In some embodiments, the IAM component is centrally controlled.

In some embodiments, the herein-described IAM may be configured to enable MFA (Multi factor authentication) for user authentication. In some embodiments, the IAM may be configured to enable tokenization (open authorization or OAuth). In some embodiments, the IAM may be configured to enable token validation. In some embodiments, the IAM may be configured to enable an adapter pattern.

In some embodiments of the automated system, the automated system may include a query sanitization component. The query sanitization component may reside in the described computing layer.

In some embodiments, the query sanitization component may be coupled to the query browser. In some embodiments, the query sanitization component may be configured to remove one or more unwanted characters from a user query entered via the query browser. In some embodiments, unwanted characters may include characters deemed dangerous for the system. In some embodiments, certain characters may be interpreted by a coding language as a syntax. In some embodiments, characters such as "/" "—", and ";" may be potentially damaging in a structured query language. In some embodiments, the query sanitization component is pluggable. In some embodiments, the query sanitization component can be incorporated into existing networks.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
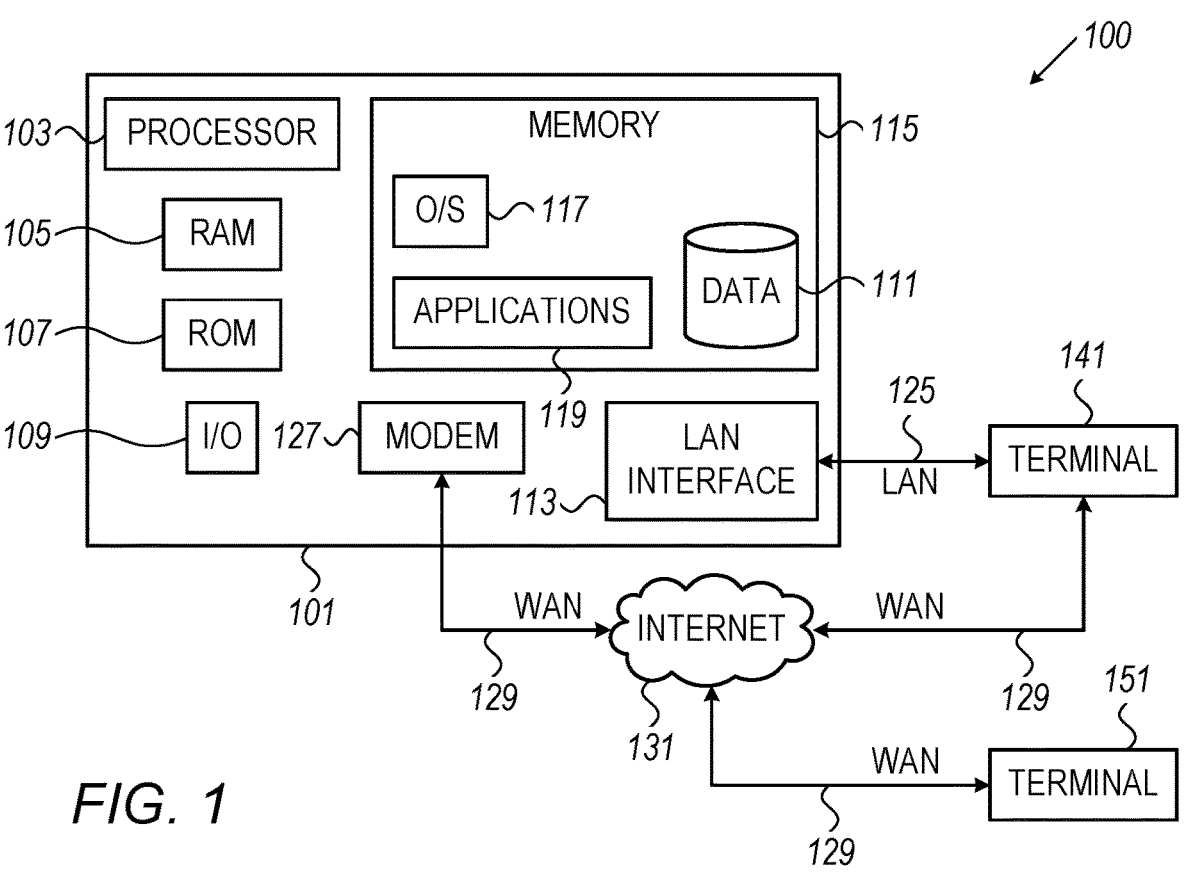
FIG. 1 shows an illustrative system in accordance with the principles of the described embodiments.

A method in accordance with the principles of the described embodiments may facilitate data sanitization. The data sanitization may be for data that is intended to be overlaid from a production environment to a non-production environment.

Embodiments of the system, as described herein, leverage machine learning, association rule learning, and/or other complex, specific-use computer systems to provide a novel approach for data sanitization.

A system in accordance with the principles of the described embodiments may include a computer processor and one or more non-transitory computer-readable media storing computer executable instructions. A method in accordance with the principles of the described embodiments may utilize a computer processor and one or more non-transitory computer-readable media storing computer executable instructions. The instructions, when executed by the computer processor, may automatically formulate data sanitization rules and/or implement such rules in a data sanitization process.

Provided herein is an automated system for preventing export of protected information. The export may be from a production environment to a non-production environment. The protected information may be derived from a non-sanitized data source. The protected information may reside within a non-sanitized data source. The non-sanitized data source may be located within the production environment. The non-sanitized data source may be configured to be overlaid onto the non-production environment, thereby generating a non-sanitized overlaid dataset.

The described system may include a data sanitization component. The data sanitization component may be configured to sanitize the non-sanitized data source, thereby generating a sanitized dataset. The sanitized dataset may be configured to be overlaid onto the non-production environment, thereby generating a sanitized overlaid dataset. Data sanitization may be performed automatically by the sanitizer component.

The described system may include a console. The console may be a user interface. The console may be for requesting access to the sanitized overlaid dataset. The access may be for a non-production environment user.

The described system may include a gatekeeper component. The gatekeeper may be configured to restrict overlaying the non-sanitized data source onto the non-production environment. The gatekeeper may be configured to restrict export of protected information into the non-production environment. The gatekeeper may be configured to control export of protected information. The gatekeeper may be configured to generate an alert when the non-sanitized data source is overlaid onto the non-production environment. The gatekeeper may be configured to generate an alert when protected information is exported into the non-production environment. The alert may be transmitted to the infosec manager.

In some embodiments of the automated system, the non-production environment may be a user acceptance testing environment. In some embodiments, the user acceptance testing environment may be for validating real-world performance of an application. In some embodiments, the non-production environment may be a performance testing environment. In some embodiments, the performance testing environment may be for evaluating performance of an application under controlled stress conditions.

In some embodiments of the automated system, the automated system may include a query sanitization component. In some embodiments, the query sanitization component may be coupled to the query browser. In some embodiments, the query sanitization component may receive queries from the query browser. In some embodiments, the query sanitization component may be configured to remove one or more unwanted characters from a user query made via the query browser.

Also provided herein is an automated system for data sanitization. The system may include a data sanitization rule engine. The rule engine may reside in the described computing layer. The system may include a data sanitization rule component. The data sanitization rule engine or component may be configured to analyze a non-sanitized data source that is located within a production environment. The rule engine or component may be configured to define a set of rules for sanitizing the non-sanitized data source. This data source, production environment, and set of rules may be referred to herein as the "first non-sanitized data source", "first production environment", and "first set of rules", respectively.

The described system may include a feature comparison component. The feature comparison component may reside in the described computing layer.

The feature comparison component may be configured to compile a feature database. The feature database may include information relating to a plurality of previously sanitized data sources (which may be referred to herein as "previous data source[s]"). The previous data sources may have undergone sanitization. The sanitization may have been performed by the described system. The database may include an identifier for each of the previous data sources. The database may include one or more features (which may be referred to herein as "associated feature[s]") associated with each of the previous data sources. The feature database may include a set of data sanitization rules (which may be referred to herein as the "set of associated data sanitization rules") implemented in connection with the previous data sources.

The described feature comparison component may be configured to identify a feature of another non-sanitized data source located within another production environment. The data source may be newly received. The data source may need to be sanitized. The data source may not have been previously sanitized. This data source and/or production environment may not yet have a sanitization script developed for it/them. This data source and production environment may be referred to herein as the "second non-sanitized data source" (or "second data source") and "second production environment", respectively.

The described feature comparison component may be configured to query the feature database. The query may seek to identify a previous data source that is similar to the second data source. The previous data source may be referred to herein as the "similar previous data source". This similar previous data source and the second data source may share a common feature. The term "similar", in this context, may indicate the existence of a common feature. In some embodiments, the common feature may be a common data field, for example a customer's phone number, identification number, or account balance. In some embodiments, the common feature may be a metadata tag. The tag may indicate the confidentiality level of a dataset or a field within the set.

The described feature comparison component may be configured to provide a data sanitization rule for the second data source. The feature comparison component may be configured to define a set of rules for sanitizing the second data source. The data sanitization rule may be associated with the similar previous data source. The data sanitization rule may be derived from the set of associated data sanitization rules of a similar previous data source. The data sanitization rule may be a rule found in the set of associated data sanitization rules of a similar previous data source. This data sanitization rule may be referred to herein as the "recommended data sanitization rule". The set of rules for the second data source may be referred to herein as the "second set of rules". This set of rules may include the mentioned recommended data sanitization rule. In some embodiments, the second set of rules may incorporate the mentioned recommended data sanitization rule.

In some embodiments, the second data source may have one or more characteristics in common with each of a plurality of previous data sources. In some embodiments, the set of sanitization rules for the second data source may incorporate one or more sanitization rules associated with each of the similar previous data sources.

In some embodiments, the second data source may share a first common data column with previous data source #1, and a second data column with previous data source #2. In some embodiments, the first column may have a first data sanitization rule associated therewith, and the second column may have a second data sanitization rule associated therewith. In some embodiments, the feature comparison component may generate a new and/or complete set of data sanitization rules specifically for the second data source.

In some embodiments, the set of rules for sanitizing the second data source may be identical to the rules of a previous data source. The previous data source may have a plurality of characteristics in common with the second data source.

The described system may include a data sanitization component. The data sanitization component may be configured to sanitize the first non-sanitized data source according to the first set of rules. In some embodiments, sanitization of the first data source proceeds according to the first set of rules. This sanitization step may generate a sanitized dataset, which may be referred to herein as the "first sanitized dataset". This sanitized dataset may be configured to be overlaid onto a non-production environment, which may be referred to herein as the "first non-production environment". This overlaying step may generate a sanitized overlaid dataset, which may be referred to as the "first sanitized overlaid dataset".

The data sanitization component may be configured to sanitize the second non-sanitized data source according to the second set of rules. This sanitization step may generate another sanitized dataset ("second sanitized dataset"). This sanitized dataset may be configured to be overlaid onto another non-production environment ("second non-production environment"). This overlaying step may generate another sanitized overlaid dataset, which may be referred to herein as the "second sanitized overlaid dataset".

In some embodiments of the described automated system, the data sanitization rule engine may be configured to receive a recommended set of data sanitization rules. The rules may be provided by an information security manager.

The rules may be provided by the herein-described data sanitization rule engine. The rule engine may automatically generate the rules. The rules may be provided by a processor. The processor may automatically generate the rules.

In some embodiments, the described automated system may include a gatekeeper. In some embodiments, the gatekeeper may be configured to restrict export of the first and/or second non-sanitized data source. In some embodiments, the gatekeeper may be configured to restrict overlaying of the first and/or non-sanitized data source onto the first and/or second non-production environment, respectively.

In some embodiments of the described automated system, the feature comparison component may include a machine learning (ML) engine or algorithm. In some embodiments, the feature comparison component may be powered by an ML engine or algorithm. In some embodiments, the ML or algorithm engine may be configured to identify, via association rule learning, one or more correlations between database features and data sanitization rules associated with the database.

As used herein, the term "association rule learning" refers, in some embodiments, to a rule-mining algorithm that tests "if . . . then" statements to define significant relationships in a dataset. An exemplary association rule is that if a customer purchases bread and butter, they also purchase milk (Agrawal, R. et al., (1993) Mining Association Rules between Sets of Items in Large Databases. Proceedings of the 1993 ACM SIGMOD International Conference on Management of Data, Washington DC, 25-28 May 1993, Vol. 22(2) of SIGMOD Records, 207-216). The antecedent of this rule consists of bread and butter and the consequent consists of milk alone. Association rules may be defined by minimum thresholds of Support, namely the fraction of occurrences in which the union of items in the consequent and antecedent of the rule is present; and Confidence, namely the fraction, among the occurrences that satisfy the antecedent, that also satisfy the consequent. If 90% of transactions that purchase bread and butter also purchase milk, then 90% is the confidence factor of the mentioned rule. An association rule can also be defined by a minimum threshold of Lift, wherein Lift measures how much more often the consequent of a rule occurs when the antecedent is present, compared to when it is absent. Lift may be the ratio of the Confidence to the frequency of the consequent in the whole dataset. In some embodiments, the minimum thresholds of Support and Confidence may be 1% and 50%, respectively. In so the minimum threshold of Lift may be 1.5. In some embodiments, the described ML algorithm automatically optimizes the Support, Confidence, and Lift thresholds in order to achieve effective data sanitization rules for new datasets. In some embodiments, the ML algorithm may utilize iterative optimization to achieve appropriate thresholds for these parameters. In some embodiments, a regulated ML model may be utilized. The ML model may make incremental learning adjustments in tandem with the determinations made by the ML engine and communicated to the regulated ML model. The ML engine may access data output from an infosec manager, other users, and/or automatic sanitization supervision component. The engine may be trained to use these data to collectively formulate and approve incremental learning adjustments with the regulated ML model. The regulated ML model and the ML engine may consider input data patterns, output data patterns, thresholds for model performance, and/or distributions of identified patterns between different ML models.

In some embodiments, the described automated system may include a data retrieval interface. In some embodiments, the system may include a query sanitization component. In some embodiments, the system may include both a data retrieval interface and a query sanitization component. The data retrieval interface and/or query sanitization component may reside in the described user input layer.

In some embodiments, the described data retrieval interface may be configured to receive a user query for retrieving a non-sanitized data source. In some embodiments, the data source may require sanitization before it is overlaid. In some embodiments, the data retrieval interface may be configured to receive a user query for retrieving a sanitized dataset.

In some embodiments, the described query sanitization component may be coupled to the query browser (which also may be referred to as a "data retrieval interface"). In some embodiments, the query sanitization component may be configured to receive user queries. In some embodiments, the query sanitization component may be configured to analyze user queries before they are transmitted to the described data sanitization component. In some embodiments, the query sanitization component may be configured to remove one or more unwanted characters from user queries before the transmission.

In some embodiments, the described automated system may include an automation control component. The automation control component may reside in the described computing layer. In some embodiments, this component may be configured to schedule the sanitization of data sources. In some embodiments, this component may be configured to schedule the overlaying of datasets after their sanitization. In some embodiments, this component may receive a rule set for each dataset from the described rule engine and schedule implementation of the rule sets. This component may serve as a gatekeeper, in some embodiments, as described herein.

In some embodiments, the described automated system may include an audit log component. The audit log component may reside in the described computing layer. In some embodiments, this component may be configured to generate an audit trail of the sanitization of the data sources. In some embodiments, the audits may include overlaying of the sanitized datasets.

In some embodiments, the described automated system may include a rule cache component. The rule cache component may reside in the described computing layer. In some embodiments, this component may be configured to cache sets of rules for sanitizing data sources. In some embodiments, this component may be configured to receive sets of rules from the described automation control component.

Also provided herein is a method for managing sanitization and overlay of protected information residing in data sources. The overlay may be from a production environment to a non-production environment. The method may utilize a computer processor and one or more non-transitory computer-readable media storing computer executable instructions. The instructions, when executed by the computer processor, may generate an alert of requested access by a user to a non-sanitized data source. The instructions may automatically generate data sanitization rules for datasets not previously sanitized.

The described method may include the step of configuring a suggested set of rules for sanitizing a non-sanitized data source. The rules may be configured by a human operator. The operator may be an information security manager. The rules may be configured by a rule engine or component. The engine or component may be a rule engine or component described herein. The rules may be configured automatically. The rules may be configured by a processor. The rules may be configured by an automated rule engine. The rules may be configured by any of the methods described herein.

The described method may include the step of receiving a determination of whether to apply the suggested set of rules to the non-sanitized data source. The determination may be made by a processor. The determination may be made by a feature comparison component. The feature comparison component may utilize an ML engine. The ML engine may utilize association rule learning. The ML engine may compare the non-sanitized data sources to previously sanitized data sources. The determination may be made by a human operator. The determination may be made by an infosec manager.

In some embodiments, when the suggested rules are deemed not applicable to the non-sanitized data source, a processor may automatically generate an altered set of rules. The processor may modify the previous set of rules. The processor may evaluate an altered set of rules for its suitability to the current dataset. The processor may halt access to the data source until an acceptable set of rules is configured and applied.

In some embodiments, when the suggested rules are deemed not applicable to the non-sanitized data source, an infosec manager may generate an altered set of rules. The manager may modify the previous set of rules. The manager may evaluate an altered set of rules for its suitability to the current dataset. The manager may halt access to the data source until an acceptable set of rules is configured and applied.

The described method may include the step of receiving a determination of whether to apply the altered set of rules to the non-sanitized data source. The determination may be made by a processor. The determination may be made by a human operator. The determination may be made by an infosec manager.

The described method may include the step of generating an alert when a user requests permission to access a non-sanitized data source. The alert may be received by an infosec manager. The alert may be received by a processor.

In some embodiments of the described methods and systems, a user or developer may be given the option to request partial or full access to the non-sanitized data source. In some embodiments, a user or developer may be able to select partial and/or full export of the data source. In some embodiments, the term "partial access" may indicate access to specified data fields or columns in a table. The access may include a specified list of objects. In some embodiments, the term "full access" may indicate access without restriction to particular data fields or columns. The access may include all objects in a specified domain.

The described method may include the step of receiving a determination of whether to grant the requested access. The infosec manager may decide or control whether the permission is granted. The infosec manager may grant permission to a particular user only after a dataset has undergone sanitization. The processor may decide or control whether the permission is granted. The processor may grant permission to a particular user only after data sanitization. The permission policy may have been previously configured. The policy may be set by an infosec manager.

Also provided herein is a method for managing sanitization and overlay of protected information. The overlay may be from a production environment to a non-production environment. The method may utilize a computer processor and one or more non-transitory computer-readable media storing computer executable instructions. The instructions, when executed by the computer processor, may configure at least one suggested set of rules for sanitizing a non-sanitized data source.

The method may include the step of configuring a suggested set of rules for sanitizing a non-sanitized data source. This data source and set of rules may be referred to herein as the "first non-sanitized data source" (or "first data source") and "first suggested set of rules", respectively. The rules may be configured by a human operator. The operator may be an information security manager. The rules may be configured automatically. The rules may be configured by a processor. The rules may be configured by an automated rule engine. The rules may be configured by any of the components described herein.

The method may include the step of receiving a request to sanitize a second non-sanitized data source, which may be referred to herein as the "second data source".

The method may include the step of automatically determining whether the second data source shares a feature in common with the first data source. When a common feature is identified, the method may include the step of recommending a data sanitization rule for the second data source, which data rule has been used for sanitization of the first data source. The common data sanitization rule between the first and second data sources may be referred to herein as the "associated data sanitization rule" or "associated rule".

The method may include the step of automatically configuring a second suggested set of rules ("second rule set") for sanitizing the second data source. In some embodiments, the second rule set may be based at least in part on the described associated rule. The second rule set may include the associated rule. In some embodiments, the second rule set may be identical to a previous data source. The second rule set may incorporate sanitization rule(s) associated with a plurality of similar data sources. In some embodiments, In some embodiments, the method may include the step of receiving a determination of whether to apply the second rule set to the data source.

In some embodiments, any of the described methods may include the step of restricting export of non-sanitized data sources to a non-production environment. In some embodiments, the method may include the step of restricting the overlay of non-sanitized data sources onto a non-production environment. In some embodiments, a method may include preventing export of non-sanitized data sources to a non-production environment. Control of one or more of these activities may reside with the infosec manager. Control of one or more of these activities may reside with the data sanitization component or engine described herein.

In some embodiments, the described method may include the step of restricting the overlay of a data source onto its non-production environment. In some embodiments, the method may include the step of preventing overlay of a data source onto a non-production environment. Control of one or more of these activities may reside with the infosec manager. Control of one or more of these activities may reside with the data sanitization component or engine described herein.

In some embodiments, the described method may include the step of receiving a request for a user to access a data source. In some embodiments, the user may be a user of a test environment.

The described method may include the step of receiving a determination of whether to grant the access to the user. The infosec manager may decide or control whether the permission is granted. The infosec manager may grant permission to a particular user only after the data has undergone sanitization. The processor may decide or control whether the permission is granted. The processor may grant permission to a particular user only after data sanitization. The permission policy may have been previously configured. The policy may be set by an infosec manager.

In some embodiments of the described systems and methods, an infosec manager may configure a general set of sanitization rules. In some embodiments, a processor may configure a general set of sanitization rules. In some embodiments, a rule engine or component may configure a general set of sanitization rules. In some embodiments, the rules may stipulate when a database needs to be sanitized. The rules may stipulate when a dataset can be exported. The rules may stipulate when a developer can access a database. The rules may be dependent on characteristics of each database. The described automated rule engine may be configurable to implement any of these characteristics.

In some embodiments of the described systems and methods, the described data sanitization rule engine may interface with a data sanitization ecosystem. In some embodiments, the ecosystem may be operated by an external service provider. In some embodiments, the rule engine may transfer data to the ecosystem. In some embodiments, the transfer may utilize a Sqoop import command.

In some embodiments of the described systems and methods, the described data sanitization rule engine may export a sanitized dataset to a target database(s) in a non-production environment(s). In some embodiments, the transfer may utilize a Sqoop export command.

In some embodiments, the described systems may be pluggable. In some embodiments, the systems can be incorporated into existing networks.

The various computing components shown in the figures may have one or more features in common with the components described herein.

The aforementioned processing device or computer processor may be a computer, as described in more detail in FIG. 1, optionally including any of the components and elements described for FIG. 1.

Figure 2:
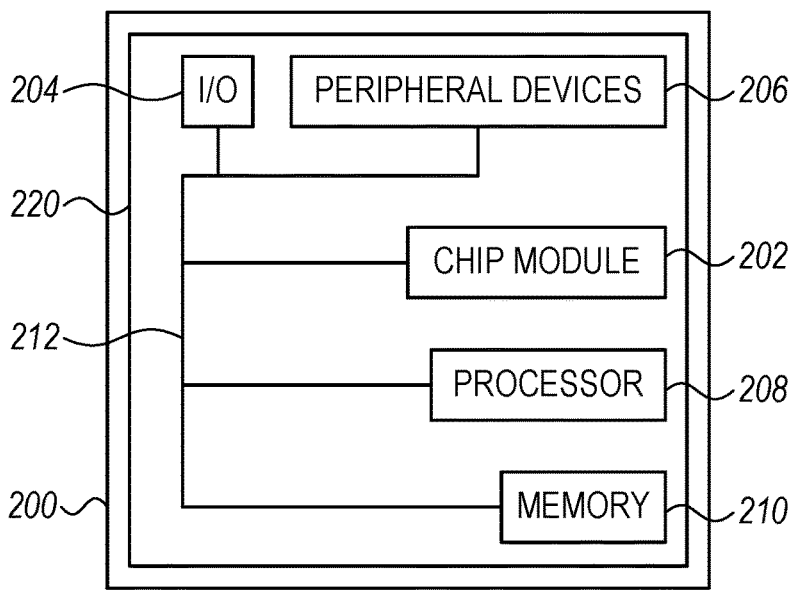
FIG. 2 shows an illustrative system in accordance with the principles of the described embodiments.

In some aspects, the processing device or computer processor may be a computer, as described in more detail in FIG. 2, optionally including any of the components and elements described for FIG. 2.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

The described computer systems may include one or more of the following hardware components: Computer 101 may have a processor 103 for controlling the operation of the device and its associated components, and may include random-access memory (RAM) 105, read-only memory (ROM) 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory; or perform and supervise data sanitization, for example as described herein.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions or perform power management routines or other suitable tasks.

Application program(s) 119 may include computer executable instructions (alternatively referred to as "programs"). The computer executable instructions may direct data sanitization as described herein. The computer executable instructions may be embodied in hardware or firmware (not shown). The computer 101 may execute the instructions embodied by the application program(s) 119 to perform various functions, such as comparing datasets, generating and implementing data sanitization rules, and generating alerts.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the described embodiments. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, physical layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
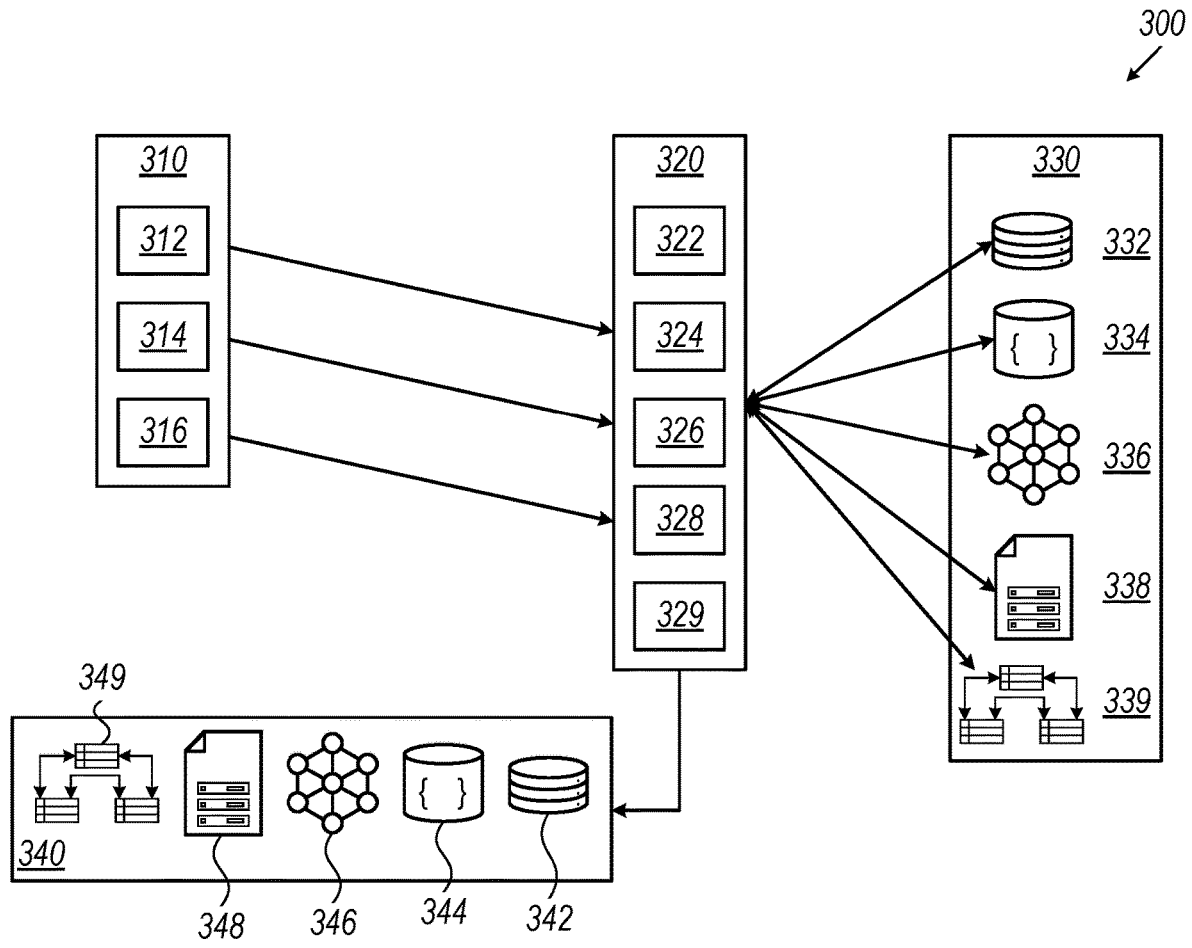
FIG. 3 is an overall architecture diagram of a sanitizer system.

FIG. 3 is an overall architecture diagram of a sanitizer system 300, including user input/monitoring and control layer 310, computing (sanitization) layer 320, data input/source database layer 330, and target databases 340. Monitoring and control layer 310 may include rule console 312, task console 314, and/or data retrieval interface (also referred to herein as "data sanitization browser") 316.

Computing layer 320 may include data sanitizer IAM 322, data sanitizer rule engine 324, automation controls and audit logs component 326, data query sanitization component 328, and/or data sanitization engine 329. Source databases 330 may include a relational database management database (RDMDBS) 332, a non-structured language query (NoSQL) database 334, a graph database 336, a document database 338, and/or a hierarchal database 339.

Figure 4:
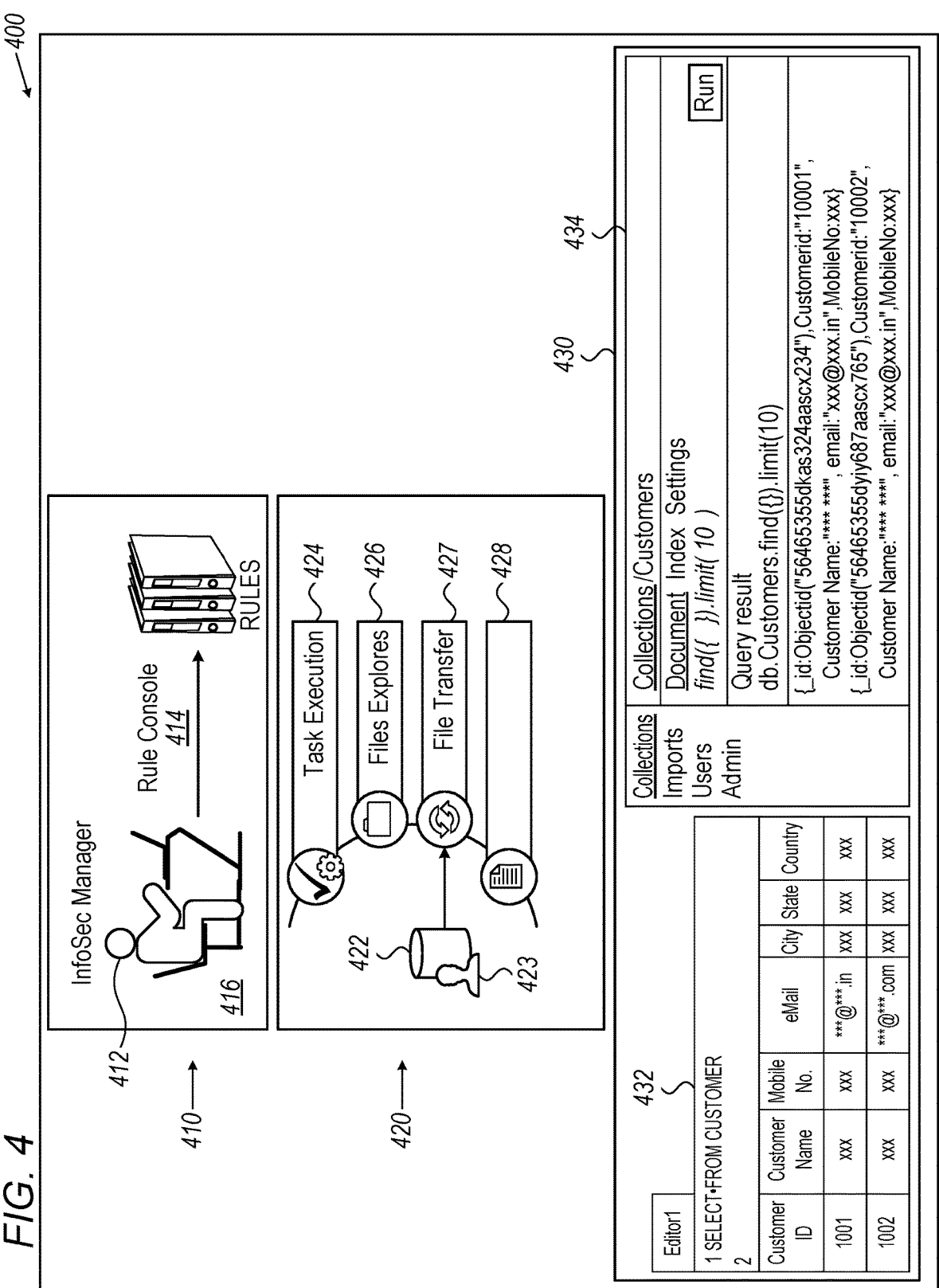
FIG. 4 is an architecture diagram of a user input (or monitoring and control) layer.

FIG. 4 is an architecture diagram of a monitoring and control layer (or user input) 400. Monitoring and control layer 400 may include rule control layer 410, task console 420, and/or data sanitization browser (or "query browser") 430. Rule control layer 410 may include rule console 414 for input from infosec manager 412; and/or rules display interface 416.

Task console 420 may include task interface 422 for use by user 423, which user may be a an infosec manager or a developer; task execution widget 424; files explorer widget 426; file transfer widget 427; and/or logs interface 428.

Data sanitization browser 430 may include sanitized data table display 432 and/or collections display 434.

Figure 5:
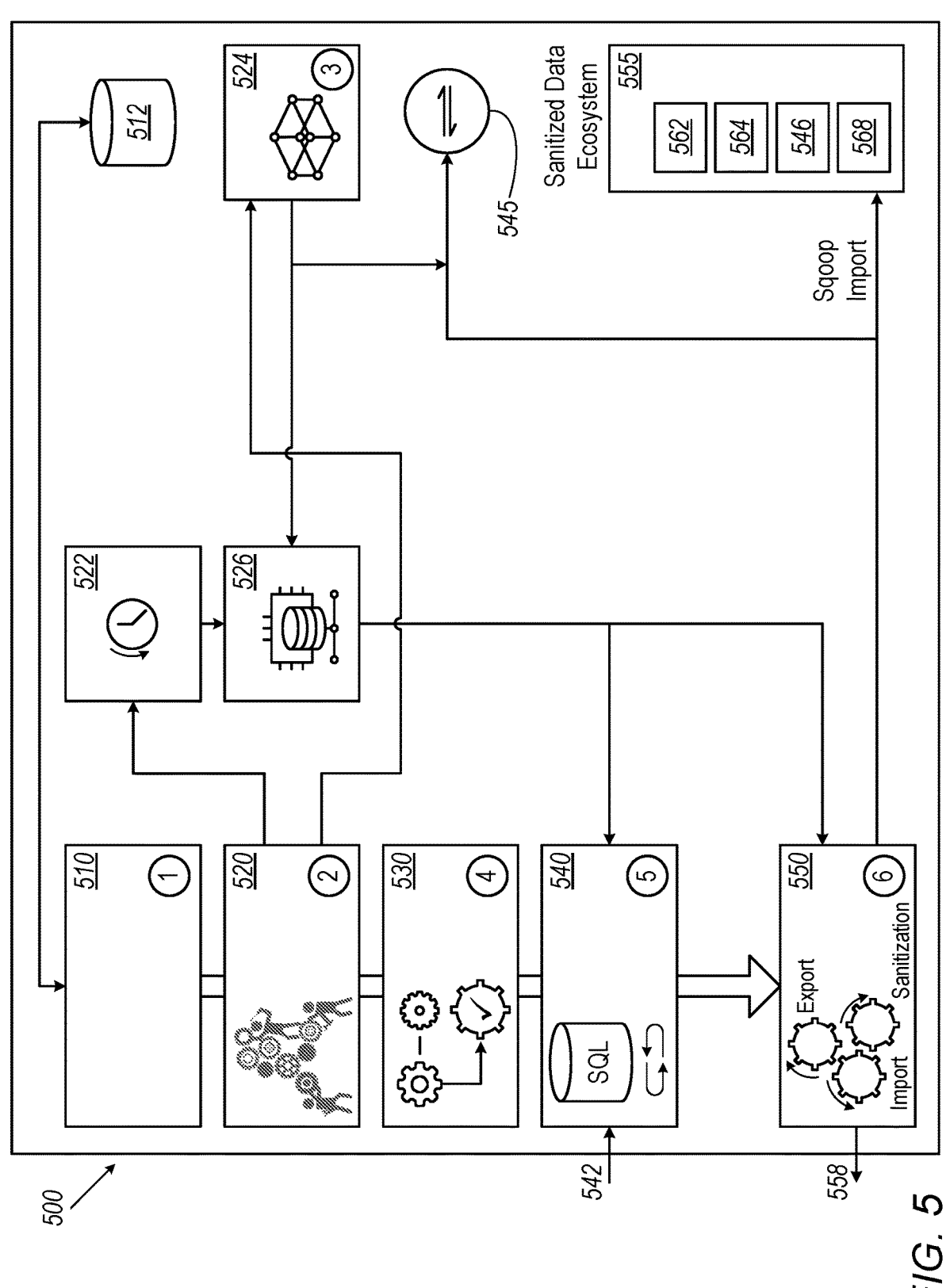
FIG. 5 is an architecture diagram of a computing layer 500.

FIG. 5 is an architecture diagram of a computing layer 500. Computing layer 500 may include IAM layer (also referred to herein as smart data sanitizer IAM) 510, IAM database 512, data sanitization rule engine (also referred to herein as "data sanitizer rule engine") 520, scheduler 522, feature comparison component (also referred to herein as "sanitization feature learner") 524, rule cache 526, automation controls and audit logs component 530, query sanitization layer (also referred to herein as "sanitized data query language") 540, database adapter layer 545, and data sanitization engine (also referred to herein as "data sanitizer engine") 550. Rule engine 520 may receive suggested rule sets from rule console 414 (see FIG. 4). Automation controls and audit logs component 530 may be configured to receive queries from task console 420 (see FIG. 4). Query sanitization layer 540 may receive commands (arrow 542) from data sanitization browser 430 (see FIG. 4).

Data sanitization engine 550 may interface with a data sanitization ecosystem 555. Ecosystem 555 may be supplied by an external service provider. Ecosystem 555 may include various data sanitization engines 562, 564, 566, 568. Data sanitization engine 550 may transfer data to data sanitization ecosystem 555. The transfer may utilize a Sqoop import command.

Data sanitization engine 550 may export (arrow 558) sanitized data to target databases 340 (see FIG. 3) in a non-production environment. The transfer may utilize a Sqoop export command.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions may be required on a specialized computer for carrying out the specialized operations, including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatus, and computer program products for data sanitization are provided. Persons skilled in the art will appreciate that the present invention can be practiced by other than the described embodiments, which are presented for purposes of illustration rather than of limitation.

What is claimed is:

1. An automated system for preventing export of protected information from a production environment to a non-production environment, wherein:

the protected information is derived from a non-sanitized data source, the non-sanitized data source being located within the production environment; and the non-sanitized data source is configured to be overlaid onto the non-production environment, thereby generating a non-sanitized overlaid dataset, the automated system comprising:

a data sanitization component, wherein the data sanitization component is configured to sanitize the non-sanitized data source, thereby generating a sanitized dataset;

wherein the sanitized dataset is configured to be overlaid onto the non-production environment, thereby generating a sanitized overlaid dataset;

a console for requesting access, for a non-production environment user, to the sanitized overlaid dataset;

a gatekeeper, wherein the gatekeeper is configured to:

restrict overlaying the non-sanitized data source onto the non-production environment; and generate an alert when the non-sanitized data source is overlaid onto the non-production environment.

2. The automated system of claim 1, wherein the non-production environment is selected from the group consisting of a user acceptance testing environment and a performance testing environment, said user acceptance testing environment for validating real-world performance of an application, and said performance testing environment for evaluating performance of an application under controlled stress conditions.

3. The automated system of claim 1, wherein the protected information is selected from the group consisting of critical data and confidential data.

4. The automated system of claim 1, the automated system further comprising an identity and access management (IAM) component, wherein the IAM component is for configuring permissions of individual users.

5. The automated system of claim 1, the automated system further comprising a query sanitization component, wherein the query sanitization component is coupled to the console and is configured to remove one or more unwanted characters from a user query via the console.

6. An automated system for data sanitization, the automated system comprising:

a data sanitization rule engine, wherein the data sanitization rule engine is configured to:

analyze a first non-sanitized data source that is disposed in a first production environment; and define a first set of rules for sanitizing the first non-sanitized data source;

a feature comparison component, wherein the feature comparison component is configured to:

compile a feature database, the feature database comprising, for at least one of a plurality of previous data sources:

an identifier;

one or more associated features; and a set of associated data sanitization rules;

identify a feature of a second non-sanitized data source that is disposed in a second production environment;

query the feature database to identify a similar previous data source, wherein the similar previous data source and the second non-sanitized data source share a common feature;

provide a recommended data sanitization rule for the second non-sanitized data source, wherein the recommended data sanitization rule is derived from the set of associated data sanitization rules; and define a second set of rules for sanitizing the second non-sanitized data source, the second set of rules comprising the associated data sanitization rule; and a data sanitization component, wherein the data sanitization component is configured to:

sanitize the first non-sanitized data source according to the first set of rules, thereby generating a first sanitized dataset; wherein the first sanitized dataset is configured to be overlaid onto a first non-production environment, thereby generating a first sanitized overlaid dataset; and sanitize the second non-sanitized data source according to the second set of rules, thereby generating a second sanitized dataset; wherein the second sanitized dataset is configured to be overlaid onto a second non-production environment, thereby generating a second sanitized overlaid dataset.

7. The automated system of claim 6, wherein the data sanitization rule engine is further configured to receive a recommended set of data sanitization rules from an information security manager.

8. The automated system of claim 6, the automated system further comprising a gatekeeper, wherein the gatekeeper is configured to restrict at least one of:

exporting at least one of the first and second non-sanitized data sources; or overlaying at least one of the first and second non-sanitized data sources onto the first and second non-production environments, respectively.

9. The automated system of claim 6, wherein the feature comparison component comprises a machine learning (ML) engine, wherein the ML engine is configured to identify, via association rule learning, one or more correlations between the one or more associated features and set of the associated data sanitization rules.

10. The automated system of claim 6, the automated system further comprising a centrally controlled identity and access management (IAM) component, wherein the IAM component is for configuring permissions of individual users.

11. The automated system of claim 6, the automated system further comprising:

a data retrieval interface, wherein the data retrieval interface is configured to receive a user query for retrieving the first or second non-sanitized data source; and a query sanitization component, wherein the query sanitization component is coupled to the data retrieval interface and is configured to remove one or more unwanted characters from the user query.

12. The automated system of claim 6, the automated system further comprising an automation control component, wherein the automation control component is configured to schedule at least one of:

the sanitizing the first non-sanitized data source;

the sanitizing the second non-sanitized data source;

overlaying the first sanitized dataset; and overlaying the second sanitized dataset.

13. The automated system of claim 6, the automated system further comprising an audit log component, wherein the audit log component is configured to generate an audit trail of at least one of:

the sanitizing the first non-sanitized data source;

the sanitizing the second non-sanitized data source;

overlaying the first sanitized dataset; and overlaying the second sanitized dataset.

14. The automated system of claim 6, the automated system further comprising a rule cache component, the rule cache component being configured to cache the second set of rules for sanitizing the second non-sanitized data source.

15. A method for managing sanitization and overlay of protected information from a production environment to a non-production environment, the method utilizing a computer processor and one or more non-transitory computer-readable media storing computer executable instructions, wherein the instructions, when executed by the computer processor, configure rules for data sanitization, the method comprising:

configuring a first suggested set of rules for sanitizing a first non-sanitized data source;

receiving a request for sanitizing a second non-sanitized data source;

automatically determining whether the second non-sanitized data source comprises a feature common to the first non-sanitized data source;

when the second non-sanitized data source comprises the feature common to the first non-sanitized data source, automatically recommending an associated data sanitization rule for the second non-sanitized data source, wherein the associated data sanitization rule is associated with the first non-sanitized data source; and automatically configuring a second suggested set of rules for sanitizing the second non-sanitized data source, wherein the second suggested set of rules is based at least in part on the associated data sanitization rule, when present.

16. The method of claim 15, the method further comprising restricting at least one of:

exporting at least one of the first and second non-sanitized data sources to the non-production environment; and overlaying at least one of the first and second non-sanitized data sources onto the non-production environment.

17. The method of claim 15, the method further comprising:

receiving a request for a user to access at least one of the first and second non-sanitized data sources; and receiving a determination of whether to grant the user the access.

* * * * *